United States Patent
Franco et al.

(10) Patent No.: US 8,335,228 B2
(45) Date of Patent: Dec. 18, 2012

(54) DUAL MODE MAP MESSAGES IN G.HN

(75) Inventors: Reuven Franco, Tel-Aviv (IL); Boaz Kol, Hod Hasharon (IL); Liam Alfandary, Ramat Gan (IL); Erez Ben Tovim, Pardes Hana-Carcur (IL)

(73) Assignee: Sigma Designs Israel S.D.I. Ltd., Tel-Aviv (IL)

( * ) Notice: Subject to any disclaimer, the term of this patent is extended or adjusted under 35 U.S.C. 154(b) by 330 days.

(21) Appl. No.: 12/841,190

(22) Filed: Jul. 22, 2010

(65) Prior Publication Data

US 2011/0019687 A1    Jan. 27, 2011

Related U.S. Application Data

(60) Provisional application No. 61/227,663, filed on Jul. 22, 2009.

(51) Int. Cl.
*H04L 12/28*    (2006.01)
*G08C 15/00*    (2006.01)
*G06F 15/173*   (2006.01)

(52) U.S. Cl. ......... 370/431; 370/252; 709/225; 709/226
(58) Field of Classification Search .................. None
    See application file for complete search history.

(56) References Cited

U.S. PATENT DOCUMENTS

2012/0026908 A1*   2/2012   Tzannes et al. ............... 370/252

* cited by examiner

*Primary Examiner* — Clemence Han
(74) *Attorney, Agent, or Firm* — Daniel J. Swirsky; AlphaPatent Associates Ltd.

(57) ABSTRACT

A method for a central coordinator of a network includes transmitting an active media access plan (MAP) using at least a regional mask and a bit allocation table (BAT) associated with the regional mask and transmitting a default MAP using only a permanent mask and a BAT associated with the permanent mask. The default MAP includes at least regional mask information.

5 Claims, 3 Drawing Sheets

DUAL MODE MAP MESSAGES IN G.HN

CROSS-REFERENCE TO RELATED APPLICATIONS

This application claims priority benefit from U.S. Provisional Patent Application No. 61/227,663, filed Jul. 22, 2009, which is incorporated herein by reference in its entirety.

FIELD OF THE INVENTION

The present invention relates to transmittal of media access plans (MAPs) generally.

BACKGROUND OF THE INVENTION

Media access plans (MAPs) are utilized in communication systems which share a single medium among multiple devices. Each MAP indicates when each device may access the medium. Media access plans are transmitted regularly to the devices in the network by a central coordinator. The transmission may be according to any suitable transmission protocol.

SUMMARY OF THE INVENTION

There is provided, in accordance with a preferred embodiment of the present invention, a method for a central coordinator of a network. The method includes transmitting an active media access plan (MAP) using at least a regional mask and a bit allocation table (BAT) associated with the regional mask and transmitting a default MAP using only a permanent mask and a BAT associated with the permanent mask, the default MAP including at least regional mask information.

Further, in accordance with a preferred embodiment of the present invention, a header of each the MAP includes a MAP type indicator.

There is also provided, in accordance with a preferred embodiment of the present invention, a method for a device joining a network. The method includes the device tuning its reception parameters to the parameters of a default MAP and decoding a transmitted MAP using only a permanent mask and a pre-defined BAT associated with the permanent mask. If the transmitted MAP is a default MAP, the method includes extracting and storing regional mask information. Finally, the method includes reading future MAPs using at least the regional mask and a BAT associated with the regional mask.

Moreover, in accordance with a preferred embodiment of the present invention, the decoding includes reading a header of a transmitted MAP to determine if the transmitted MAP is a default MAP.

Finally, there is also provided, in accordance with a preferred embodiment of the present invention, a method for a device of a network. The method includes reading a header of a transmitted MAP to determine if the transmitted MAP is a default MAP, if the transmitted MAP is a default MAP, reading the transmitted MAP using a permanent mask and a BAT associated with the permanent mask and if the transmitted MAP is not a default MAP, reading the transmitted MAP using at least a regional mask and a BAT associated with the regional mask.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
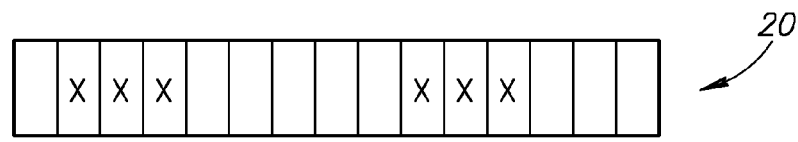
FIGS. 1A and 1B are schematic illustrations of regional and permanent masks, respectively, useful in understanding the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The G.hn standard operates within a radio frequency bandwidth of 0 to 100 MHz, within which other communication protocols also operate. Accordingly, some portions of the frequency range may not be used for G.hn operation. The frequencies which G.hn cannot use are of two types: those which are part of international communication protocols, and those which cannot be used in a certain region, country, etc. The first type of frequencies will be permanently removed from G.hn's frequency range of operation. The second type of frequencies, which may be utilized regionally by other, typically non-international communication protocols, will be removed only for G.hn networks operating in that specific region. For example, the military of one country may utilize a frequency range different than that of another country and at least one of these ranges may fall within the G.hn range. In another example, a country or a region within a country may have allocated its spectrum differently than another country or region and the powerline devices may not transmit on the allocated spectrum.

Applicants have realized that devices joining an existing network may not know of any regional regulations of the frequency range, implemented for all devices in the region. Typically, a central coordinator of the network is configured to "mask out" the sub-carriers (e.g. frequencies) utilized in the region. Such a mask is called a "regional" mask, since it is operative only for the particular region or country. An exemplary regional mask 20 is shown in FIG. 1A where each X masks out one sub-carrier.

Figure 1B:
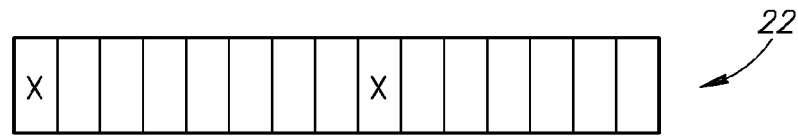

An exemplary "permanent" mask 22, for the frequencies that, despite being within the frequency range of the standard, are never to be used, is shown in FIG. 1B. As mentioned hereinabove, this may be useful to enable another communication standard which utilizes a portion of the same frequency range to operate in conjunction with the G.hn standard. FIG. 1B shows an exemplary permanent mask 22. As can be seen, the two masks of FIGS. 1A and 1B are not the same.

As Applicants have realized, in order to allow "self install" of devices in the network, the regional masks are initially configured in the central coordinator and then passed from the central coordinator to the other devices of the network. Thus, they are not initially known by any new device added to the local network. As a result, the new device cannot reliably decode the signals transmitted on the local network when it first joins the network.

Of particular concern are the MAP (media access plan) messages, which are messages generated by the central coordinator which contain important information relating to the management and operation of the network. For the network to work properly, it is essential that all nodes receive this message correctly.

One prior solution for transmitting MAP messages is to have the central coordinator load the information either on all subcarriers within the frequency range excluding only the permanently masked subcarriers, or only on a pre-defined set of sub-carriers. This allows new nodes that are unaware of the regional mask to correctly decode the MAP message. However, the central coordinator also has to filter the resulting signal before transmission to attenuate sub-carriers not allowed by regional regulations. As a result, the data bits loaded on any regionally masked sub-carriers may be removed from the transmitted signal prior to transmission, and this usually leads to degraded performance in MAP transmissions, due to the fact that bits loaded onto the filtered sub-carriers are not easily decoded. It may require that each MAP transmission repeat some of the bits of the MAP multiple times to ensure that all bits are properly received by all devices.

Figure 2:
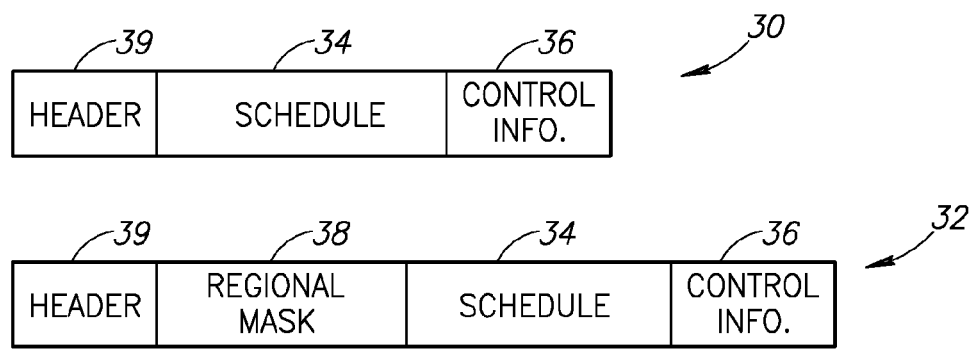
FIG. 2 is a schematic illustration of two types of media access plan (MAP) transmissions.

In accordance with an embodiment of the present invention and as shown in FIG. 2, to which reference is now made, the central coordinator may have two types of MAP messages defined for it, an active MAP message 30 and a default MAP message 32. Active MAP message 30 may include standard MAP elements, such as a schedule 34 of timeslots allocated to the network devices through which the devices may access the network and control information 36 providing information about the functioning of the network. In accordance with a preferred embodiment of the present invention, default MAP message 32 may include regional mask information 38 in addition to the information of active MAP message 30. Regional mask information 38 may include a listing of the sub-carriers or frequencies that are not to be used in the local network.

Typically, a header 39 may begin each MAP message 30 and 32, with an indication of the MAP type (active or default), so that the MAP message may be properly decoded. Headers 39 may always be transmitted with only permanent mask 22, to ensure that it is always properly decoded.

Figure 3:
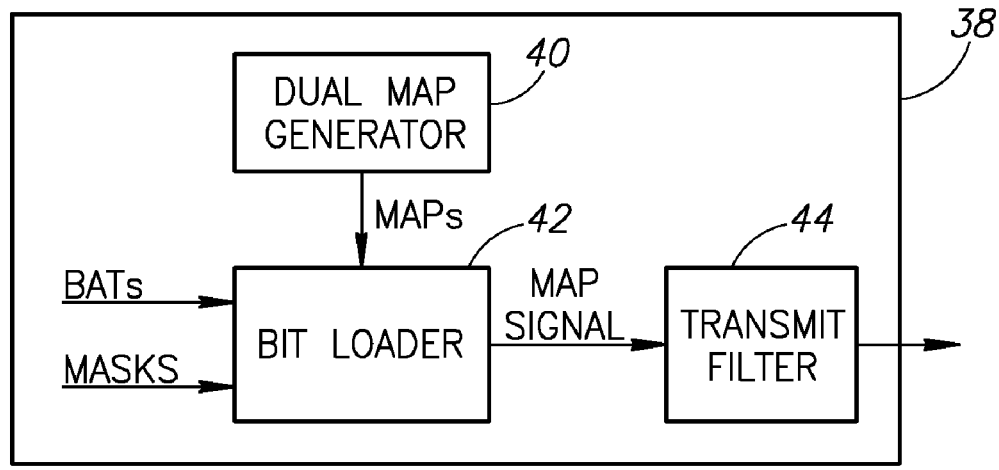
FIG. 3 is a schematic illustration of elements of a central coordinator to generate the MAP transmissions of FIG. 2, constructed and operative in accordance with a preferred embodiment of the present invention.

Reference is now made to FIG. 3, which illustrates the elements of a central coordinator 38 which generate a transmitted MAP message. Central coordinator 38 may comprise a dual MAP generator 40, capable of generating either active MAP 30 or default MAP 32, a bit loader 42 which may load the bits of a generated MAP onto the relevant sub-carriers, thereby to create a MAP signal, and a transmit filter 44 to attenuate regional sub-carriers from the analog MAP transmission signal.

To operate, bit loader 42 may have access to the regional and permanent masks as well as to pre-defined bit allocation tables (BAT). The BATs associate each sub-carrier with the number of bits to be loaded thereon, where 1 or 2 bits per sub-carrier is typical for the MAP signals. In accordance with a preferred embodiment of the present invention, there may be pre-defined BAT types to provide bit loading on all sub-carriers except for those sub-carriers listed in the permanent mask (i.e. these BAT types exclude use of the sub-carriers only in the permanent mask 22) while other BAT types may provide bit loading on all sub-carriers except for those sub-carriers listed in the permanent mask and those in the regional mask (i.e. these BAT types exclude use of the sub-carriers in both the permanent mask 22 and the regional mask 20). The second type may provide regionalization to the local network as described hereinabove while the first type may be decodable by all devices, and particularly by new devices.

As described in more detail hereinbelow, bit loader 42 may receive the generated MAP 30 or 32 and may select the appropriate mask type and bit loading according to the MAP type listed therein. Bit loader 42 may then convey the analog signal to transmit filter 44 which may filter the signal, attenuating sub-carriers according to the regional regulations, and may transmit the resultant analog MAP signal.

Figure 4A:
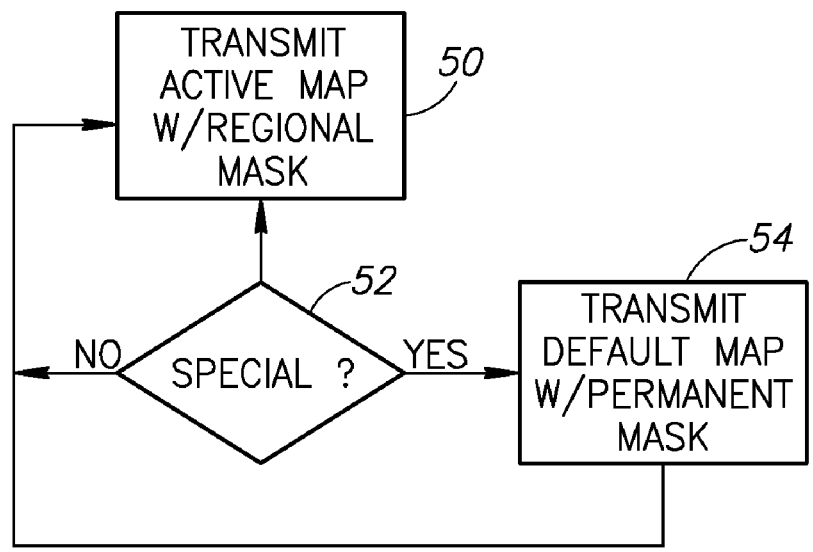
FIG. 4A is a flow chart illustration of the operations of the central coordinator of FIG. 3.
Figure 4B:
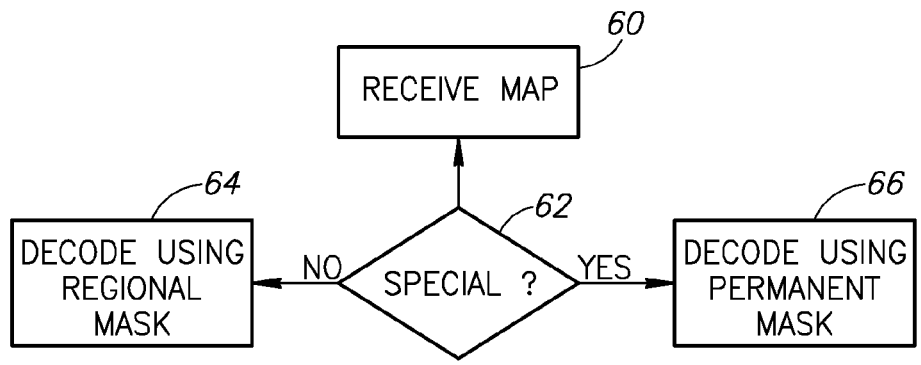
FIG. 4B is a flow chart illustration of the operation of an already registered device in the local network.
Figure 4C:
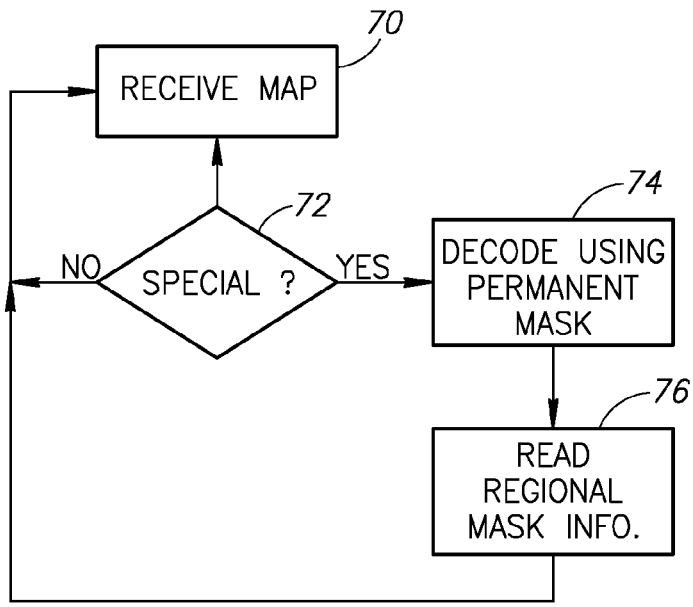
FIG. 4C is a flow chart illustration of the operation of a new device upon registering to the local network.

Reference is now made to FIGS. 4A, 4B and 4C, which, together, illustrate a method for a local network to operate and to accept new devices, constructed and operative in accordance with an embodiment of the present invention. FIG. 4A illustrates the operation of central coordinator 38, FIG. 4B illustrates the operation of an already registered device in the local network and FIG. 4C illustrates the operation of a new device upon registering to the local network.

As shown in FIG. 4A, when dual MAP generator 40 generates active MAP 30, bit loader 42 may transmit (step 50) active MAP 30 using the BAT types which provide bit loading which is masked by both regional and permanent masks 20 and 22. However, when dual MAP generator 40 generates a default MAP 32, as checked by step 52, bit loader 42 may transmit (step 52) default MAP 32 using the BAT types which provide bit loading masked only by permanent mask 22.

As shown in FIG. 4B, whenever an already registered device may receive (step 60) a MAP, it may read (step 62) the header (transmitted with a BAT type which is masked only by permanent mask 22) to determine the MAP type and the BAT type to be used for the rest of the transmission. If the MAP is an active MAP, the existing device may decode (step 64) the rest of the MAP using regional and permanent masks 20 and 22 and the appropriate BAT. If the MAP is a default MAP, the existing device may decode (step 66) the rest of the MAP using only permanent mask 22 and the appropriate BAT.

As shown in FIG. 4C, a new device does not know the regional mask and thus, cannot read any of the active MAPs it may receive (step 70) until a default MAP 32 is transmitted. Thus, the device may tune its reception parameters to the parameters of the default MAP, which include at least permanent mask 22 and an expected BAT type for default MAPs.

When a default MAP 32 may be transmitted, as checked in step 72, the new device may decode (step 74) it, using permanent mask 22 and the appropriate BAT. The new device may then read (step 76) regional mask 38 from default MAP 32 as well as the schedule information listed in default MAP 32. With the regional mask information, and following some additional registration procedures, the new device may now be fully registered and may become an already registered device, operating according to the method of FIG. 4B.

It will be appreciated that default MAP 32 may be useful in advertising regional mask 20 both to the new device and to the existing devices. Thus, dual MAP generator 40 may generate default MAP 32 if there is a change in regional mask 20.

It will be appreciated that, by reducing the number of MAPs transmitted with only permanent mask 22, the reception of MAP messages may be greatly improved.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for a central coordinator of a network, the method comprising:
   transmitting an active media access plan (MAP) using at least a regional mask and a bit allocation table (BAT) associated with said regional mask; and
   transmitting a default MAP using only a permanent mask and a BAT associated with said permanent mask, said default MAP comprising at least regional mask information.

2. The method according to claim 1 and wherein a header of each said MAP comprises a MAP type indicator.

3. A method for a device joining a network, the method comprising:
   said device tuning its reception parameters to the parameters of a default MAP;
   decoding a transmitted MAP using only a permanent mask and a pre-defined BAT associated with said permanent mask;
   if said transmitted MAP is a default MAP, extracting and storing regional mask information; and
   reading future MAPs using at least said regional mask and a BAT associated with said regional mask.

4. The method according to claim 3 and wherein said decoding comprises reading a header of a transmitted MAP to determine if said transmitted MAP is a default MAP.

5. A method for a device of a network, the method comprising:
   reading a header of a transmitted MAP to determine if said transmitted MAP is a default MAP;
   if said transmitted MAP is a default MAP, reading said transmitted MAP using a permanent mask and a BAT associated with said permanent mask; and
   if said transmitted MAP is not a default MAP, reading said transmitted MAP using at least a regional mask and a BAT associated with said regional mask.

* * * * *